Jan. 14, 1941.  H. BRUINING ET AL  2,228,945
ELECTRIC DISCHARGE TUBE
Filed March 15, 1938
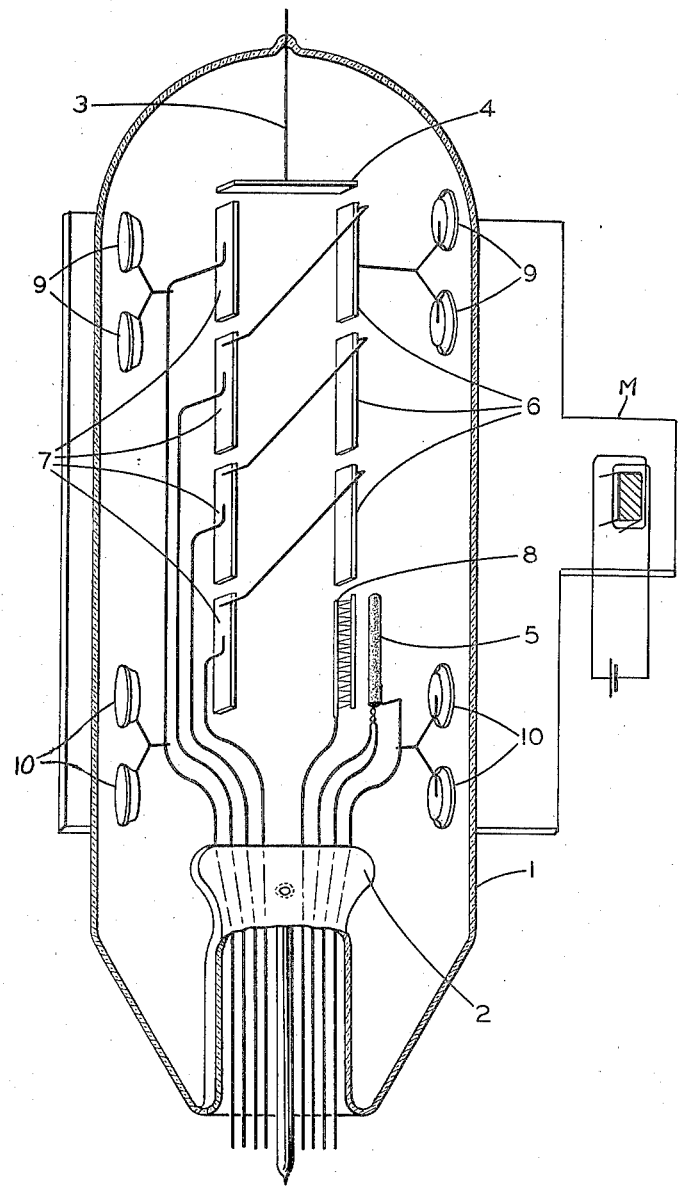
INVENTORS
HAJO BRUINING
JAN HENDRIK DE BOER
CORNELIS FREDERIK VEENEMANS
BY Charles McClair
ATTORNEYS.

Patented Jan. 14, 1941

2,228,945

UNITED STATES PATENT OFFICE 2,228,945

ELECTRIC DISCHARGE TUBE

Hajo Bruining, Jan Hendrik de Boer, and Cornelis Frederik Veenemans, Eindhoven, Netherlands, assignors, by mesne assignments, to Radio Corporation of America, New York, N. Y., a corporation of Delaware Application March 15, 1938, Serial No. 195,940
In the Netherlands March 30, 1937

5 Claims. (Cl. 250—175)

This invention relates to an electric discharge tube comprising an electrode system including one or more secondary-emission electrodes. The term "secondary-emission electrode" is to be understood to mean a body consisting at least over part of its surface area of a material readily emitting secondary electrons when struck by a stream of primary electrons. Such electrodes may be used in so-called secondary-emission tubes, electron multipliers and the like.

Various materials have already been proposed for use at the surface of electrodes emitting secondary electrons. In most of the prior patents and publications dealing therewith alkali metals such as, for instance, caesium and alkaline earth metals, or the oxides of these metals, are mentioned.

When making various experiments with the substances known from literature, such as have been made by us, rather divergent phenomena are found which are inexplicable at the first sight. We have found, for instance, that the secondary emission of an electrode coated with an alkali- or alkaline earth metal, may have different initial values; it may also vary during operation of the tube, and even materially increase in definite cases. On the other hand the secondary electron emission of oxides appears to decrease in many cases during operation of the tube.

We have finally found after making all these experiments that the optimum results can be obtained when using an electric discharge tube according to the present invention, which tube comprises an electrode system including a secondary-emission electrode which consists at least over part of its surface of one or more compounds of the alkali-, alkaline earth or earth metals, beans being provided through which at will chemical substances can be introduced into the tube which substances or reagents are capable of converting alkali-, alkaline earth- or earth metal into a chemical compound. Such substances may be formed or evolved during operation of the tube. By "alkali metals" are to be understood the metals lithium, sodium, potassium, rubidium and caesium, and the alkaline earth metals including the metals: calcium, strontium, barium and in the case under view also beryllium and magnesium, whilst the earth metals include: aluminum, scandium, yttrium, lanthanum and the metals of the group called rare earth metals: furthermore titanium, zirconium, hafnium and thorium.

In fact, we have found that the rather divergent phenomena occurring when using materials readily emitting secondary electrons are due to the fact that a secondary emission electrode yields the maximum secondary-emission when it is coated with a compound of an alkali-, alkaline earth- or earth metal whose secondary-electron emitting capacity appears to be much higher than that of the corresponding metals themselves, and furthermore it has been found that when starting with such a compound the secondary emission decreases during operation of the tube, which is probably due to the fact that the compound partly decomposes during operation and free metal evolves. By starting with a compound containing substantially no free metal and by taking care that any of the compound which is decomposed during operation of the tube is reformed or restored to its original condition we have found that secondary emission electrodes are obtained yielding a constant high secondary emission for a considerable time.

According to a definite manner of carrying out the invention a material which, upon heating, produces reactive gas capable of combining with an alkali-, alkaline earth-, or earth metal is provided either in the tube itself or in a space communicating with the tube. For this purpose the tube may be connected to a spherical capillary or provided with a capsule which contains a substance such as manganese dioxide from which oxygen is expelled upon heating to a comparatively low temperature. However, it is also possible to use other sources such as carbonates, from which carbonic acid is set free by heating, which may also give rise to the formation of oxide with the alkali-, alkaline earth-, or earth metals.

In order that the remaining gases may not affect the further operation of the tube itself when carrying out these treatments in the tube after it has been completely sealed off, a getter consisting, for instance, of barium or magnesium, may be vaporised, after production of the gases forming the chemical compounds, so as to bind the residual gas. In this case regeneration of the primary cathode will be necessary in most cases.

The substance readily emitting secondary electrons may be provided in a known manner on a conductive substratum. In many cases, for instance, with fluorescent materials provided on glass it has been found to be advantageous, however, to provide this material on an insulator.

The invention will be more clearly understood by reference to the drawing schematically representing, by way of example, a discharge tube according thereto.

In the drawing 1 is the wall of an electron multiplier one end of which is furnished with a press 2 in which is sealed a large number of supply conductors. At the other end a supply conductor 3 for a collector electrode, such as an anode 4 is led out through the wall. In addition the tube comprises a primary cathode 5, secondary-emission electrodes 6, a certain number of electrodes 7, which are connected in each instance to a secondary-emission electrode arranged in front of a succeeding electrode 7, and a grid 8. The tube is surrounded with a magnet M which may be arranged as disclosed in U. S. Patent 2,073,599, Malter, March 9, 1937, and by means of the electric fields set up between the electrodes 6 and 7 produces such a field distribution that the electrons issuing from the cathode 5 impinge on the first secondary-emission electrode 6 and the electrons issuing from this electrode gain access to the succeeding secondary-emission electrode and so on. These electrodes or emitters 6 are coated with a substance having a high secondary-emission such as caesium oxide, barium carbonate, strontium carbonate and the like. The tube contains capsules 9 and 10, the capsules 9 containing manganese dioxide from which oxygen can be expelled by heating to a comparatively low temperature, whereas the capsules 10 contain magnesium pellets. When the tube has been operated for some time and the secondary emission of the electrodes decreases a capsule 9 is heated, which may be effected by local heating from the outside or by high frequency heating, so that oxygen is set free and any alkali or alkaline earth metal formed on the emitter 6 is oxidised again. After that a getter capsule 10 is heated, due to which magnesium evaporates in the tube and removes the residual oxygen. In this manner a very high secondary-emission is maintained for a considerable time. When using, for instance, barium oxide at 400 volts a secondary-emission ratio of 4.75 is obtained for a very long time, caesium chloride yielding 6.5 at 400 volts, barium fluoride 5.0 at 600 volts, magnesium oxide 2.18 at 300 volts. At the same voltages this secondary emission ratio for the pure metals is 0.8 for barium, 0.72 for caesium and 0.95 for magnesium.

What we claim is:

1. An electron discharge tube comprising an evacuated envelope enclosing a source of primary electrons, a collector electrode, a cold electrode having a surface of high secondary electron emissivity and consisting of an oxygenic compound of a metal selected from the group consisting of the alkali metals and the alkaline earth metals, and a substance adapted to liberate in said envelope when heated a reactive atmosphere capable of forming said oxygenic compound with said metal.

2. An electron discharge tube comprising an evacuated envelope enclosing a source of primary electrons, a collector electrode, a cold secondary electron emitting electrode having a surface consisting of an oxide of a metal selected from the group consisting of the alkali metals and the alkaline earth metals, a heatable capsule and a substance in said capsule capable of evolving oxygen when heated.

3. An electron discharge tube as defined in claim 2 in which the oxygen evolving substance is manganese dioxide in a metal capsule.

4. An electron discharge tube comprising an evacuated envelope enclosing a source of primary electrons, a collector electrode, a cold electrode having a surface capable of emitting secondary electrons in a ratio to impacting electrons greater than unity and comprising an oxygenic compound of magnesium, and a substance capable of liberating in said envelope an oxidizing atmosphere.

5. An electron discharge tube as defined in claim 4 and having in addition a metal capsule containing a getter capable of evolving magnesium vapor when heated.

HAJO BRUINING.
JAN HENDRIK DE BOER.
CORNELIS FREDERIK VEENEMANS.